United States Patent Office 3,245,829
Patented Apr. 12, 1966

3,245,829
THERMOPLASTIC STYRENE POLYMER
COMPOSITION
Raymond D. Beaulieu, North Wilbraham, and Bernard Freedman, Springfield, Mass., assignors to Monsanto Company, a corporation of Delaware
No Drawing. Filed Apr. 19, 1962, Ser. No. 188,841
7 Claims. (Cl. 117—100)

This invention relates to a foamable thermoplastic styrene polymer composition and to a process for preparing the composition.

It is an object of this invention to provide a particulate foamable thermoplastic styrene polymer composition having coated thereon a thermosettable resin.

Another object of this invention is to provide a process for preparing the thermosettable resin coated foamable thermoplastic styrene polymer composition.

Briefly, the above and other objects of this invention are attained by coating foamable thermoplastic styrene polymer particles with a particular thermosettable resin, which resin can be advanced to an infusible state upon the application of heat.

The following examples are set forth to more clearly illustrate the principle and practice of this invention to one skilled in the art and unless otherwise indicated all parts and percentages are on a weight basis.

Example I

To a Cincinnati two-wheel laboratory rotary muller, add three hundred parts of foamable polystyrene particles, containing therein about 7 weight percent of n-pentane, and 15 parts of a powdered phenol-formaldehyde resin, which resin is prepared by the condensation reaction of about 0.7 mol of formaldehyde per mol of phenol in the presence of an acid catalyst and which resin contains about 12% of hexemethylene tetramine. The dry materials are first dry blended for approximately two minutes. To this mixture is then added 4 parts of an ethanol-water mixture, which mixture consists of 1 part of water and 3 parts of ethanol. Mixing is continued until the foamable particles are coated and free-flowing. The total time of mixing is about 12–15 minutes.

The foamable polystyrene particles are observed to be uniformly coated with the thermosetting resin.

Example II

Example I is repeated with the exception that the foamable polystyrene beads are first partially expanded by exposure thereof to boiling water for about 3–5 minutes. During the operation of the laboratory muller, sufficient clearance is set between the muller wheels and the base or floor of the muller so as to prevent crushing of the partially expanded polystyrene particles.

The results obtained are similar to those obtained in Example I.

Example III

Example I is repeated except that the phenol-formaldehyde reaction product is recovered in an organic solvent; namely, a denatured commercial grade of ethyl alcohol. The resin has a solids content of about 70%. About 12 parts of powdered hexamethylene tetramine based on the weight of resin solids are first dry blended with the foamable polystyrene particles. The phenol-formaldehyde reaction product in ethyl alcohol is then added to the foamable particles. Mixing is continued until the foamable particles are coated with the resin and are free-flowing.

The results obtained are essentially the same as described in Example I.

The coated foamable particles are then foamed in a closed mold by steam heating thereof for about 3–5 minutes. The foamed structure obtained therefrom is observed to be fully foamed with adjacent foamed cells being bonded by the phenol-formaldehyde resin at the interface of adjacent foamed cells.

Example IV

Example III is repeated except that the foamable polystyrene beads are first partially expanded by exposure thereof to boiling water for about 3–5 minutes. Again during the operation of the muller, sufficient clearance is set between the muller wheels and the base or floor of the muller so as to prevent crushing of the partially expanded polystyrene particles.

The results obtained are esesntially the same as described in Example III.

Example V

Example I is repeated except that a powdered melamine formaldehyde resin is employed herein. The resin is prepared by the condensation reaction of 3.0 mols of formaldehyde per mol of melamine in the presence of an alkaline catalyst. The reaction product is then spray dried to form a powdered resin system.

The results obtained are essentially the same as those obtained in Example I.

This invention is directed to a novel particulate foamable thermoplastic styrene polymer composition having coated thereon a thermosettable resin, which thermosettable resin can be advanced to an infusible state upon the application of heat. More specifically, this invention is directed to a particulate foamable thermoplastic styrene polymer composition comprising 100 parts of the particulate foamable thermoplastic styrene polymer having coated thereon 0.5–10 parts and preferably 2–5 parts of the thermosettable resin. The foamable thermoplastic styrene polymer has incorporated therein a volatile organic foaming agent having an atmospheric boiling point of less than about 100° C. and preferably less than about 80° C.

This invention is also directed to the process of preparing the novel particulate foamable thermoplastic styrene polymer composition.

The thermosettable resins which can be employed in the practice of this invention can be any thermosettable resin which can, upon the application of heat, be advanced to an infusible state. However, the thermosettable resins which are particularly useful in the practice of this invention are the phenol-aldehyde resins and aminoplast resins, which resins are generally prepared by the condensation reaction of the proper constituents in the presence of appropriate catalysts.

The phenol-aldehyde resins of this invention are preferably phenol-formaldehyde resins commonly known as phenolics. They are the product resulting from the condensation reaction of about 0.6–3.0 mols of formaldehyde per mol of phenol. The phenolic resins applicable in the practice of this invention are either (1) a two-stage powdered phenolic resin consisting of a mixture of a powdered novolac and hexamethylene tetramine as a cross-linking agent, (2) a novolac recovered in an organic solvent, or (3) a one-stage phenolic resin recovered in an organic solvent. The two-stage phenolic resins are generally prepared by reacting less than one mol of formaldehyde per mol of phenol and adding thereto a cross-linking material such as hexamethylene tetramine. The novolac recovered in an organic solvent is also prepared in the same manner except that the novolac is recovered in the organic solvent at the end of the reaction thereof. The one-stage phenolic resins are generally prepared by reacting an excess of formaldehyde per mol of phenol and then recovering the product in an organic solvent. However, it should be noted that the organic solvent employed with the resin should be one which does not have a solvent action on the foamable thermoplastic styrene polymer particles.

The aminoplast resins which can be used in the practice of this invention are preferably melamine-formaldehyde resins generally prepared by the condensation reaction of 2-4 mols of formaldehyde per mol of melamine in the presence of an alkaline catalyst. The resin is then recovered in the powdered state generally by the spray-drying technique.

Examples of other phenol-aldehyde resins which can be employed herein in place of those shown in the examples are the substituted phenol-formaldehyde resins such as styrenated phenol-formaldehyde, catechol-formaldehyde, di-methyl phenol-formaldehyde, cresol-formaldehyde, resorcinol-formaldehyde and hydroquinone-formaldehyde. Examples of other aminoplast resins which can be employed herein in place of those shown in the examples are urea-formaldehyde and substituted melamine-formaldehyde such as butylated melamine-formaldehyde.

The preferred thermosettable resin to be employed in the practice of this invention is the phenol-formaldehyde resin prepared from the condensation reaction of 0.6-0.9 mol of formaldehyde per mol of phenol in the presence of an acid catalyst and recovering the product in an organic solvent such as ethyl alcohol.

The foamable thermoplastic styrene polymer particles employed in the practice of this invention can be any of the known foamable thermoplastic styrene polymer compositions. These compositions generally comprise thermoplastic styrene polymer particles having a foaming agent incorporated therein. They may also have incorporated therein such other ingredients which aid in producing certain desirable characteristics in the foamed material. Such ingredients may include, for example, certain inorganic pigments which aid in producing fine cell sizes in the foamed styrene polymer. One particular inorganic pigment is calcium silicate.

The thermoplastic styrene polymer employed herein can be either the homopolymer or interpolymer of styrene. The interpolymer of styrene should contain at least 50 weight percent and preferably 75 weight percent of styrene with the balance being up to at least 50 weight percent and preferably up to 25 weight percent of any monomeric compound which will copolymerize with the styrene, particularly those monomeric compounds having the vinylidene group $CH_2=<$. Typical examples of some of these monomeric materials are ethylene, propylene, butadiene, acrylic acid, methacrylic acid, acrylonitrile, alpha-methylstyrene, vinyl toluene, o-chlorostyrene, maleic anhydride, dibutyl fumarate, etc. Sometimes it is desirable to employ blends of two or more such thermoplastic styrene polymers. The preferred thermoplastic styrene polymer to be employed in the practice of this invention is a homopolymer of styrene having an average molecular weight in the range of about 30,000 to about 95,000.

As stated previously, the foaming agent which is employed with the thermoplastic styrene polymer and which is incorporated therein is a volatile organic compound having an atmospheric boiling point of less than 100° C. and preferably between about $-10°$ C. to about 80° C. Typical examples of the foaming agents which can be employed to prepare the foamable thermoplastic styrene polymers of this invention are propane, butane, isobutane, pentane, hexane, isohexane, cyclohexane, etc.; halogenated hydrocarbons, i.e., ethyl chloride, propyl chloride, butyl chloride and particularly the perchlorofluoro-carbons. Certain amines can also be employed such as ethylamine, propylamine, butylamine, etc. Sometimes it is feasible and desirable to employ mixtures of an organic foaming agent of the type described and an organic compound having a solvent action on the thermoplastic styrene polymers. Such mixtures are generally 70-99% by weight of the volatile organic foaming agent and, correspondingly, 30-1% by weight of the organic compound having a solvent action on the thermoplastic styrene polymer. Examples of such compounds having a solvent action and which can be employed in admixture with the volatile organic foaming agent are acetone, methylene chloride, styrene monomer, benzene, xylene, chloroform, etc. Preferably, the organic solvent should have a boiling point below about 80° C. The preferred foaming agent to be employed in the practice of this invention is n-pentane.

The critical feature of this invention is in the adaptability with which the thermosettable resin can be coated onto the foamable thermoplastic styrene polymer particles. The novelty of the present invention is, therefore, in the combination of the thermosettable resin and the foamable thermoplastic styrene polymer particles wherein the foamable thermoplastic styrene polymer particles are coated with the thermosettable resin.

Broadly, the process by which the foamable thermoplastic particles are coated with the thermosettable resin involves admixing 100 parts of foamable polymer particles with 0.5-10 parts of the thermosettable resin until the foamable polymer particles are coated with resin. When the thermosetting resin is in the powdered state, the admixture is merely dry blended until the foamable polymer particles are sufficiently coated with the dry powdered resin. Alternatively, an alcohol-water mixture may also be employed which mixture tackifies the powdered resin to such an extent that the thermosettable resin becomes firmly coated onto the foamable polymer particles when the alcohol-water mixture evaporates. Evaporation thereof occurs upon continued mixing until the coated foamable polymer particles are free-flowing. In addition, the rate of evaporation of the alcohol-water mixture may be increased by passing warm air over the particles during mixing thereof. This warm air may have a temperature in the range of about 75° F. to about 190° F. Higher temperatures may also be employed, but for a shorter period of time since caution must be observed so as not to cause foaming of the foamable particles.

When employing the alcohol-water mixture as set forth above, the amount added is about 18-24 weight percent based on the weight of thermosettable resin employed and preferably about 20-22 weight percent thereof. The alcohol-water mixture is in the ratio of 2-4 parts of alcohol per 1 part of water on a weight basis with the preferred ratio being 3 parts of alcohol per 1 part of water. The alcohol which can be employed in the practice of this invention can be methanol, ethanol, propanol or isopropanol with the preferred alcohol being ethyl alcohol.

When employing a thermosettable resin of the type wherein a phenol-formaldehyde reaction product is contained in an organic solvent, the alcohol-water mixture is not necessary. The process only requires continued mixing of the admixture of the foamable polymer particles and the thermosettable resin until the coated foamable polymer particles are free-flowing.

It may be feasible and in some cases desirable to include a lubricant. Such a lubricant which may be included in the composition of this invention is one selected from the group consisting of ethylene-bis-stearamide, calcium stearate, aluminum stearate, magnesium stearate and zinc stearate. The amount of lubricant which can be incorporated herein is about 2-6 weight percent based on the weight of the thermosettable resin employed.

In the practice of this invention it is noted that one of the particular advantages obtained is that the coated foamable polymer particles have good storage stability. By this it is meant that the particles do not lose the foaming agent by diffusion thereof upon storage. This is an important feature since loss of foaming agent can result in erratic performance during foaming of the foamable particles. In addition, when the composition of this invention is foamed upon the application of heat, the resulting foamed structure has excellent strength due to the foamed cells being adhesively joined at the interface by the thermosettable resin.

It will thus be seen that the objects set forth above, among those made apparent from the preceding description, are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A particulate partially expanded foamable thermoplastic styrene polymer composition comprising a particulate partially expanded foamable thermoplastic styrene polymer having coated thereon a thermosettable resin, which thermosettable resin can be advanced to an infusible state upon the application of heat; said partially expanded foamable styrene polymer being selected from the group consisting of homopolymers and interpolymers of styrene with the interpolymers containing at least 50 weight percent of styrene and having incorporated therein a volatile organic foaming agent having an atmospheric boiling point of less than about 100° C.

2. A particulate partially expanded foamable thermoplastic styrene polymer composition comprising 100 parts of the particulate partially expanded foamable thermoplastic styrene polymer having coated thereon 0.5–10 parts of a thermosettable resin, which thermosettable resin can be advanced to an infusible state upon the application of heat and which resin is selected from the group consisting of phenol-aldehyde resins and aminoplast resins; said partially expanded foamable styrene polymer being selected from the group consisting of homopolymers and interpolymers of styrene with the interpolymers containing at least 50 weight percent of styrene, and having incorporated therein a volatile organic foaming agent having an atmospheric boiling point of less than about 100° C.

3. The composition of claim 1 wherein 2–5 parts of a thermosettable resin is coated on 100 parts of the foamable thermoplastic styrene polymer particles.

4. The composition of claim 1 wherein the thermosettable resin is the condensation reaction product of 0.6–3.0 mols of formaldehyde per mol of phenol.

5. The composition of claim 1 wherein the thermosettable resin is the condensation reaction product of 2–4 mols of formaldehyde per mol of melamine.

6. The composition of claim 1 wherein the thermosettable resin is the condensation reaction product of 1–2 mols of formaldehyde per mol of urea in the presence of an alkaline catalyst.

7. The composition of claim 1 wherein the thermoplastic styrene polymer is a homopolymer of styrene.

References Cited by the Examiner

UNITED STATES PATENTS

| | | | |
|---|---|---|---|
| 2,806,509 | 9/1957 | Bozzacco et al. | 117—100 X |
| 2,894,918 | 7/1959 | Killoran et al. | 260—2.5 |
| 2,965,514 | 12/1960 | Less et al. | 117—100 |
| 3,042,633 | 7/1962 | White | 117—100 X |
| 3,086,885 | 4/1963 | Jahn | 117—100 |
| 3,154,604 | 10/1964 | McMillan | 264—45 |

WILLIAM D. MARTIN, *Primary Examiner.*